United States Patent [19]
Brundige

[11] 4,443,390

[45] Apr. 17, 1984

[54] METHOD FOR MAKING AMALGAM PELLETS

[75] Inventor: William L. Brundige, West Caldwell, N.J.

[73] Assignee: U.S. Philips Corporation, New York, N.Y.

[21] Appl. No.: 361,213

[22] Filed: Mar. 24, 1982

[51] Int. Cl.³ .......... B01D 2/02

[52] U.S. Cl. .......... 264/13; 264/8

[58] Field of Search .......... 264/8, 13

[56] References Cited

U.S. PATENT DOCUMENTS 3,346,673 10/1967 Last et al. .......... 264/8

3,676,534 7/1972 Anderson .......... 264/9

3,887,667 6/1975 Clark .......... 264/8

4,027,718 6/1977 Lundgren .......... 264/8

*Primary Examiner*—James R. Hall
*Attorney, Agent, or Firm*—Norman N. Spain

[57] ABSTRACT

A method for forming sodium-mercury amalgam pellets of predetermined size. The amalgam is heated to a liquid state in a reservoir and discharged from an orifice at a controlled rate in droplet form onto a rotating disc. The droplets solidify into pellet form as the disc rotates and are automatically dislodged and discharged from the disc into a storage vessel. The method is preferably practiced in a controlled inert atmosphere.

5 Claims, 2 Drawing Figures

METHOD FOR MAKING AMALGAM PELLETS

BACKGROUND OF THE INVENTION

This invention relates to a method for making sodium-mercury amalgam pellets for use as a part of the discharge sustaining fill of a high-pressure sodium (HPS) discharge lamp.

In the prior art practice the sodium-mercury amalgam used as the discharge sustaining fill in a high-pressure sodium discharge lamp has been delivered to the discharge lamp arc tube as fine salt like granules introduced through the exhaust tubulation at one end of the arc tube body.

In newer versions of the high-pressure sodium discharge lamp, the arc tube body is now constructed without exhaust and fill tubulation and the end closures are ceramic buttons instead of refractory metal end caps with their associated exhaust and fill tubulation. With this configuration, liquid amalgam has been introduced into the open end of an arc tube that has had one end previously sealed. Amalgam heated to a liquid is retained in a reservoir that is pierced by a plunger which has been suitably notched to form a cavity for the required charge of amalgam. Motion of the cavity into and out of the liquid measures the droplet that enters the arc tube. The introduction of amalgam is more readily and reliably preformed if the amalgam is in the form of a pellet of predetermined weight.

SUMMARY OF THE INVENTION

In accordance with the present invention a method has been developed for forming sodium-mercury amalgam pellets of predetermined size. The apparatus used in this invention includes a dispensing means comprising an amalgam reservoir, a discharge tube extending from the reservoir and an orifice at the end of the discharge tube remote from the reservoir. The orifice is situated a short distance above a rotatable disc mounted for rotation beneath the orifice means for receiving droplets therefrom. Drive means is connected to the disc for rotating the disc at a predetermined speed whereby droplets of sodium-mercury amalgam falling from the orifice deposit on the rotating disc and solidify into pellets during less than a single rotation of the disc. Means are provided for dislodging the pellets from the rotating disc after they solidify which directs the pellets to a collector means in which they are retained until needed for use in providing a specific predetermined sodium-mercury amalgam dose for the arc tube of a high-pressure discharge lamp. Heater means are associated with the reservoir, the discharge tube and the orifice to maintain the amalgam at a predetermined temperature and valve means is provided in the discharge tube adjacent to the orifice to control the flow rate of the amalgam into the orifice and hence the spacing between droplets on the disc.

The method of the invention involves the heating of a predetermined ratio of sodium and mercury to a predetermined temperature to form a solution, releasing droplets of predetermined volume of the solution from an orifice onto a rotating disc, rotating the disc at a predetermined speed, whereby the droplets solidify into pellet form on the disc during rotation of the disc and automatically dislodging the pellets from the disc and delivering the pellets into a container. The entire process is performed in an inert atmosphere preferable in an atmosphere of argon.

BRIEF DESCRIPTION OF THE DRAWING

Many of the attendant advantages of the present invention will become more readily apparent and better understood as the following detailed description is considered in connection with the accompanying drawings in which.

DESCRIPTION OF THE PREFERRED EMBODIMENT

Figure 1:
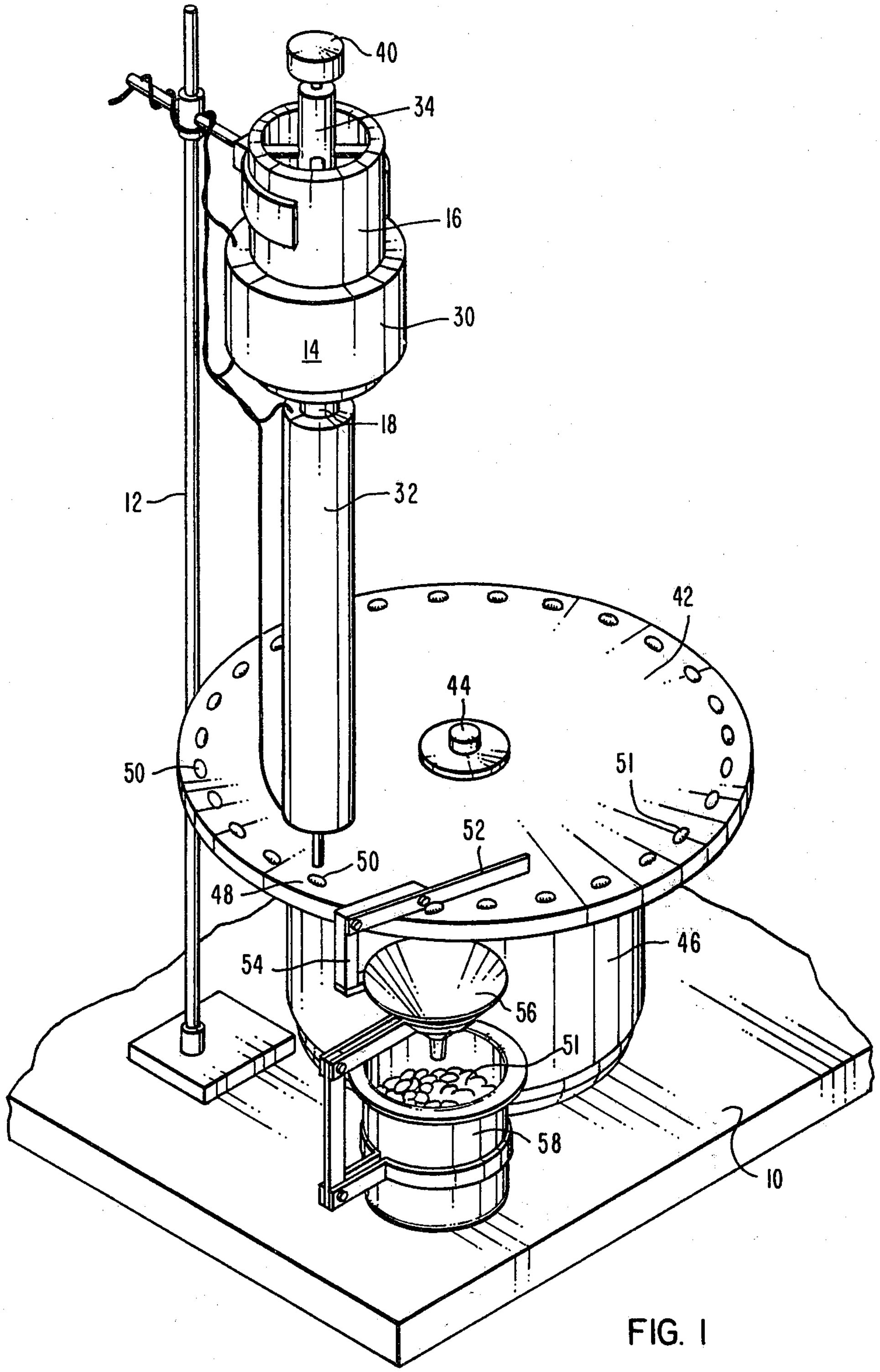
FIG. 1 is an isometric view of the pellet forming device of this invention.
Figure 2:
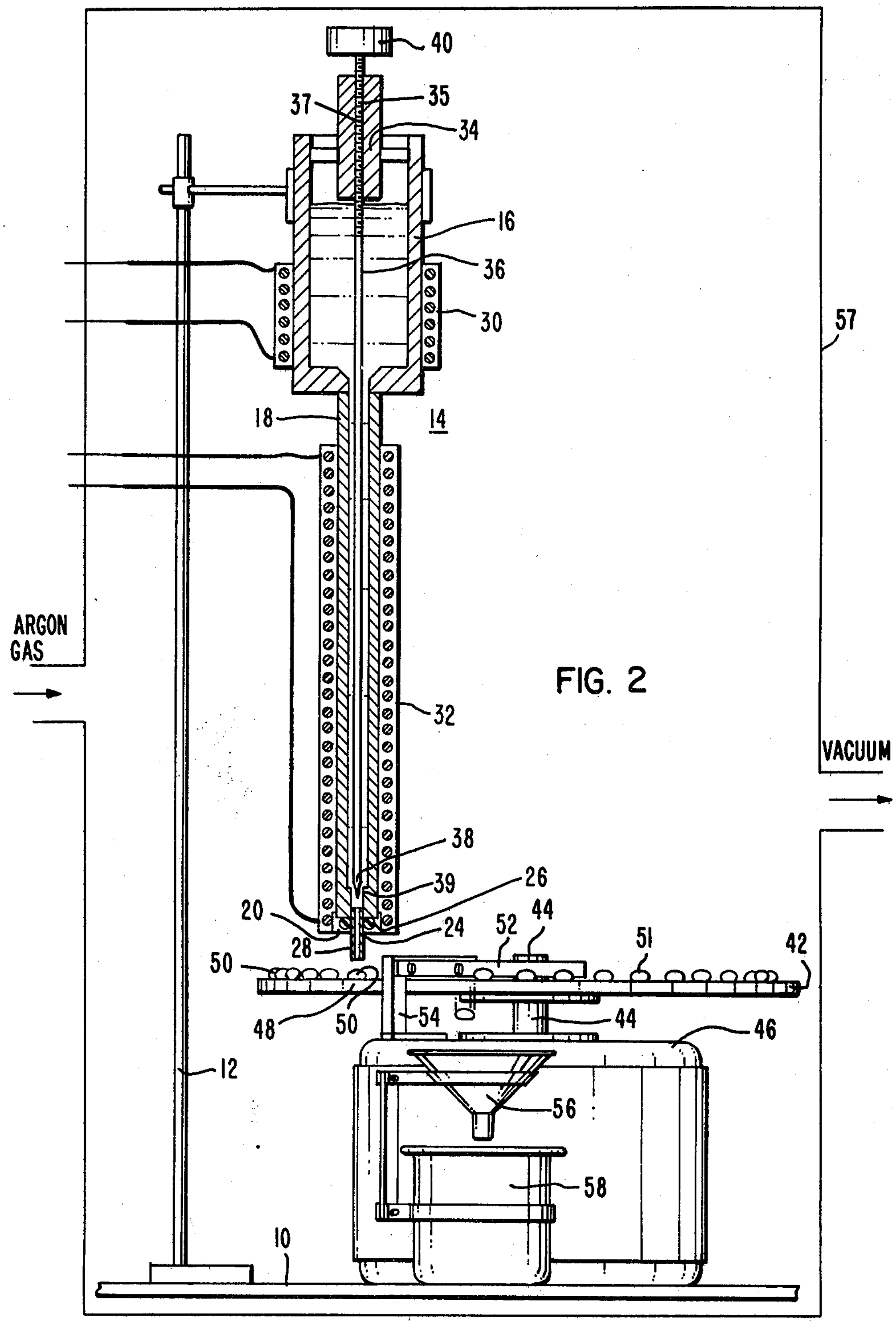
FIG. 2 is a side-elevation view thereof partly in section.

Referring now in detail to the drawing wherein like reference characteristics represent like parts throughout the several views, there is illustrated in FIGS. 1 and 2 the apparatus used in the invention and which must be employed in an inert atmosphere, and preferably in a dry box. The apparatus is disposed on a separate base plate 10. A mounting stand 12 is provided to support the droplet dispensing means 14 which includes a sodium-mercury amalgam reservoir 16 having connected thereto at its lower end a discharge tube 18 which discharge tube 18 at its other end terminates in a closure member 20 which includes a nozzle-receiving orifice 24 at its end or bottom surface. The nozzle-receiving orifice includes an O-ring seal 26 which is adapted to receive and retain a square-cut hypodermic needle 28 forming the nozzle.

The reservoir 16 is provided with a heating coil 30 and the discharge tube 18 is also provided with a heating coil 32 which serve to maintain the sodium-mercury amalgam in a liquid state within the reservoir and discharge tube. The heating coil 32 also serves to heat the closure member 20 and the orifice 28.

At the upper end of the reservoir 16 a valve-mounting structure 34 is provided which includes an elongated threaded aperture 35 through which an elongated valve shaft 36 extends. The valve shaft 36 has at its lower end a needle valve 38 which extends into a valve seat 39 in the bottom end of the discharge tube 18 and at its upper end includes a flow-rate adjusting knob 40. A threaded portion 37 of the shaft 36 within the valve-mounting structure 34 defines the position of the needle valve 38 with respect to the valve seat 39 thereby controlling the flow rate of the liquid sodium-mercury amalgam into the nozzle 28. Situated about $\frac{1}{4}$ inch below the end of the nozzle 28 is a stainless steel disc 42 which is mounted on the drive shaft 44 of a motor 46. The disc 42 is caused to rotate at a predetermined speed by the motor 46 and as drops of sodium-mercury amalgam fall from the orifice 28, they are deposited on the disc near its periphery at 48 in the form of a droplet 50. As the disc 42 rotates, the droplets remain for almost one full revolution on the surface of the disc where they solidify to pellet form 51 and slightly adhere to the stainless steel surface.

The droplets now in pellet form proceed to removal means in the form of a blade member 52 which overlies the upper surface of the disc 42 and is disposed at an angle to the path of the pellets by a mounting bracket 54. As the pellets encounter the blade 52 they are dislodged from the surface of the stainless steel disc 42 and move outwardly from their original position due to the angle of the blade with respect to their travel path until they fall off the edge of the disc into a funnel 56 which directs the pellets to a storage container 58.

In accordance with the preferred embodiment, the heater coils 30 and 32 preferably maintain the sodium-mercury amalgam within the reservoir 16, discharge tube 18 and nozzle 28 at about 130° C. The sodium-mercury amalgam is preferably about 25 wt.% sodium, but in some applications it is desirable that other ratios be used such as 21% or 19% depending upon the characteristics of the lamp in which the amalgam is to be used. The needle valve 38 controls the frequency with which droplets leave the nozzle 28 and in combination with the speed of rotation of the disc 42 determines the spacing between the droplets on the disc surface. The size or weight of the droplet is a function of the size and shape of the orifice, the surface tension and density of the liquid. Square cut hypodermic tubing, as the nozzle, has worked well for this purpose. The size of the pellets, and hence the preselected dose size for an arc tube, may be changed as desired simply by interchanging the size of the hypodermic tube 26 inserted into the opening 24 in the bottom face of the closure member 20. In order to prevent splattering of the droplet it is preferred that the end of the hypodermic tube 28 be situated about $\frac{1}{4}$ inch above the rotating disc 42.

With a 10 inch diameter disc and a disc speed of 6 RPM, the valve 38 can be set to deposit droplets at $\frac{3}{8}$ inch intervals and will provide approximately 30,000 sodium-mercury amalgam pellets per hour of approximately 50 milligrams in weight. The approximately 50-milligram pellets can be produced from a square cut standard 19-gauge stainless steel hypodermic tube.

The entire operation must be performed in an inert atmosphere because of the hygroscopic nature of sodium. Preferably, the operation is performed in a dry box having an argon atmosphere therein which dry box

57 is shown schematically in FIG. 2. Such a dry box is readily available, for example, from Laminar Flow Inc., 102 Richard Road, Ivyland, Pa.

As will be apparent from the foregoing, the method of this invention provides a large number of sodium-mercury amalgam pellets of uniform size in a form which is readily suited for use as the sodium-mercury amalgam dose for a high-pressure sodium discharge lamp arc tube.

What is claimed is:

1. The method of making sodium-mercury amalgam pellets comprising the steps, in an inert atmosphere, of:

heating predetermined amounts of sodium and mercury to a predetermined temperature to form a liquid amalgam;

releasing droplets of said liquid of predetermined volume from an orifice situated above a rotating disc;

receiving said droplets on said rotating disc at predetermined intervals;

solidifying said droplets into pellet form on said disc during rotation thereof; and dislodging said formed pellets from said disc and delivering said pellets into a container.

2. The method according to claim 1 wherein said predetermined temperature is about 130° C.

3. The method according to claim 1 wherein said predetermined volume of said droplets may be selected by changing the size of said orifice.

4. The method according to claim 1 wherein the spacing of droplets on said rotating disc is controlled by controlling the flow rate of said liquid to said orifice.

5. The method according to claim 1 wherein said inert atmosphere is an argon atmosphere.

* * * * *

UNITED STATES PATENT AND TRADEMARK OFFICE
CERTIFICATE OF CORRECTION

PATENT NO. : 4,443,390

DATED : April 17, 1984

INVENTOR(S) : WILLIAM L. BRUNDIGE

It is certified that error appears in the above-identified patent and that said Letters Patent is hereby corrected as shown below:

(73) Assignee

"U.S. Philips Corporation" should be
--North American Philips Electric Corp.--.

Signed and Sealed this

*Twenty-fifth* Day of *September 1984*

[SEAL]

*Attest:*

GERALD J. MOSSINGHOFF

*Attesting Officer* *Commissioner of Patents and Trademarks*